United States Patent
Lin et al.

(10) Patent No.: US 10,826,989 B2
(45) Date of Patent: Nov. 3, 2020

(54) DATA STORAGE SYSTEM WITH INFORMATION EXCHANGE MECHANISM AND METHOD OF OPERATION THEREOF

(71) Applicant: SMART Modular Technologies, Inc., Newark, CA (US)

(72) Inventors: Fong-Long Lin, Fremont, CA (US); Michael Rubino, San Jose, CA (US)

(73) Assignee: SMART Modular Technologies, Inc., Newark, CA (US)

( * ) Notice: Subject to any disclaimer, the term of this patent is extended or adjusted under 35 U.S.C. 154(b) by 521 days.

(21) Appl. No.: 14/512,624

(22) Filed: Oct. 13, 2014

(65) Prior Publication Data

US 2016/0105510 A1 Apr. 14, 2016

(51) Int. Cl.
H04L 29/08 (2006.01)

(52) U.S. Cl.
CPC .................. *H04L 67/1097* (2013.01)

(58) Field of Classification Search
CPC ............ G04F 11/3476; G04F 11/0727; G04F 11/0766; G04F 11/0775; G04F 11/3055; H04L 41/069; H04L 41/5003
USPC ....................................................... 709/217
See application file for complete search history.

(56) References Cited

U.S. PATENT DOCUMENTS

| 6,351,776 | B1 * | 2/2002 | O'Brien | G06F 17/30067 707/999.001 |
| 8,112,489 | B1 * | 2/2012 | Cox | G06F 11/2033 709/208 |
| 8,738,725 | B2 | 5/2014 | McEntee | |
| 8,843,781 | B1 * | 9/2014 | Chiang | G06F 3/06 714/42 |
| 9,720,598 | B2 * | 8/2017 | Malwankar | G06F 3/0611 |
| 2002/0184481 | A1 * | 12/2002 | Bish | G06F 3/0613 713/1 |
| 2007/0180328 | A1 * | 8/2007 | Cornwell | G06F 11/073 714/42 |
| 2008/0081559 | A1 * | 4/2008 | Parikh | H04W 88/06 455/41.2 |
| 2009/0064251 | A1 * | 3/2009 | Savoor | G06F 11/2294 725/110 |
| 2011/0314325 | A1 * | 12/2011 | Nakayama | G06F 1/28 714/4.2 |
| 2013/0041997 | A1 | 2/2013 | Li et al. | |
| 2013/0159797 | A1 * | 6/2013 | Peng | G11C 16/349 714/718 |
| 2014/0047166 | A1 * | 2/2014 | Asnaashari | G06F 12/0246 711/103 |

* cited by examiner

Primary Examiner — James E Springer
Assistant Examiner — Patrick F Ngankam
(74) Attorney, Agent, or Firm — Wong & Rees LLP (57) ABSTRACT

A data storage system, and a method of operation thereof, includes: a host initialization module for initializing a data storage unit; a command process module, coupled to the host initialization module, for processing a read command or a write command performed on the data storage unit; and a status scheduler module, coupled to the command process module, for generating a check status request to inquire a storage unit status of the data storage unit, wherein the check status request occurs without interrupting a host.

20 Claims, 6 Drawing Sheets

DATA STORAGE SYSTEM WITH INFORMATION EXCHANGE MECHANISM AND METHOD OF OPERATION THEREOF

TECHNICAL FIELD

The present invention relates generally to a data storage system and more particularly to a system for information exchange.

BACKGROUND ART

Data storage, often called storage or memory, refers to computer components and recording media that retain digital data. Data storage is a core function and fundamental component of consumer and industrial electronics, especially devices such as computers, televisions, cellular phones, mobile devices, and digital video cameras.

Data storage systems are inevitable for modern day computing. All known computing platforms ranging from handheld devices to large super computers use storage systems for storing data temporarily or permanently. Beginning from punch cards capable of storing a few bytes of data, data storage systems have reached to multi Terabytes of capacities in comparatively less space and power consumption.

As seen in modern day computers, data storage devices can be found in many forms. Data storage devices can be classified based on many criterions. Data storage devices can include primary storage and secondary storage. Data storage devices can be further classified based on the memory technology that they use, based on its data volatility.

Classifications of memory devices can include primary, secondary, and tertiary storage. The classifications can also include volatile storage, non-volatile storage, read only and writable storage, random access storage, sequential access storage, magnetic storage, optical storage, and semiconductor storage.

Oftentimes, problems related to maintenance and serviceability aspects of storage are not given enough attention in system architecture, but it can make or break service level agreements (SLA) for application response times. Understanding how to build a cost-effective, high-performance storage system can save money not only in the storage subsystem, but in the rest of the system as well.

Thus, a need still remains for better cost-effective, high-performance storage systems. In view of the increasing demand for the cost-effective, high-performance storage systems, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

Embodiments of the present invention provide a method of operation of a data storage system including: initializing a data storage unit; processing a read command or a write command performed on the data storage unit; and generating a check status request to inquire a storage unit status of the data storage unit, wherein the check status request occurs without interrupting a host.

Embodiments of the present invention provide a data storage system, including: a host initialization module for initializing a data storage unit; a command process module, coupled to the host initialization module, for processing a read command or a write command performed on the data storage unit; and a status scheduler module, coupled to the command process module, for generating a check status request to inquire a storage unit status of the data storage unit, wherein the check status request occurs without interrupting a host.

Certain embodiments of the invention have other steps or elements in addition to or in place of those mentioned above. The steps or the elements will become apparent to those skilled in the art from a reading of the following detailed description when taken with reference to the accompanying drawings.

BEST MODE FOR CARRYING OUT THE INVENTION

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs.

The term "module" referred to herein can include software, hardware, or a combination thereof in embodiments of the present invention in accordance with the context in which the term is used. For example, the software can be machine code, firmware, embedded code, and application software. Also for example, the hardware can be circuitry, processor, computer, integrated circuit, integrated circuit cores, a microelectromechanical system (MEMS), passive devices, environmental sensors including temperature sensors, or a combination thereof.

There are problems associated with many types of storage units that have different failure mechanisms and life-spans in data storage systems. Serviceability and data security are very important for data center applications. There is a critical need to monitor each of the storage units' status and perform maintenance ahead of time or outside critical windows. Backup data before data of the storage units is un-recoverable.

Hot data and cold data affect the life-spans of some of the storage units, e.g., flash or solid state drive (SSD) wear leveling. Leveling hot data and cold data can help extend the life-spans of the storage units. An SSD can do wear leveling within itself. However, wear leveling between the storage units has not been done. In other words, wear leveling has been done in individual drives for hot and cold data but the embodiments of the present invention are able to go to next level, i.e., across different SSDs.

Hot data is data that is accessed frequently. For example, hot data can include recent emails or popular products on an e-commerce site. Cold data is data that is accessed infrequently or written continuously. Cold data can be less timely or less frequently accessed than hot data. For example, cold data can include week-old emails.

There are Self-Monitoring Analysis and Reporting Technology (S.M.A.R.T.) commands defined in hard disk drive (HDD) or SSD standards. The standard S.M.A.R.T. commands provide very limited information and many useful commands are vendor specific. A lot of software effort is needed to make different vendors' products compatible.

These protocols ride on an existing main data channel and interfere with user data transfers. Some types of the storage units do not have a standard yet. Even the storage units from the same company may have difficulty communicating with various types of storage units in a system. It can be very difficult to collect information and manage the storage units.

At this time, the storage units are lacking a universal hardware or software standard to communicate or manage above-mentioned issues effectively. Embodiments of the present invention solve these problems. The embodiments provide a separate unified communication channel to address the above issues or problems.

Figure 1:
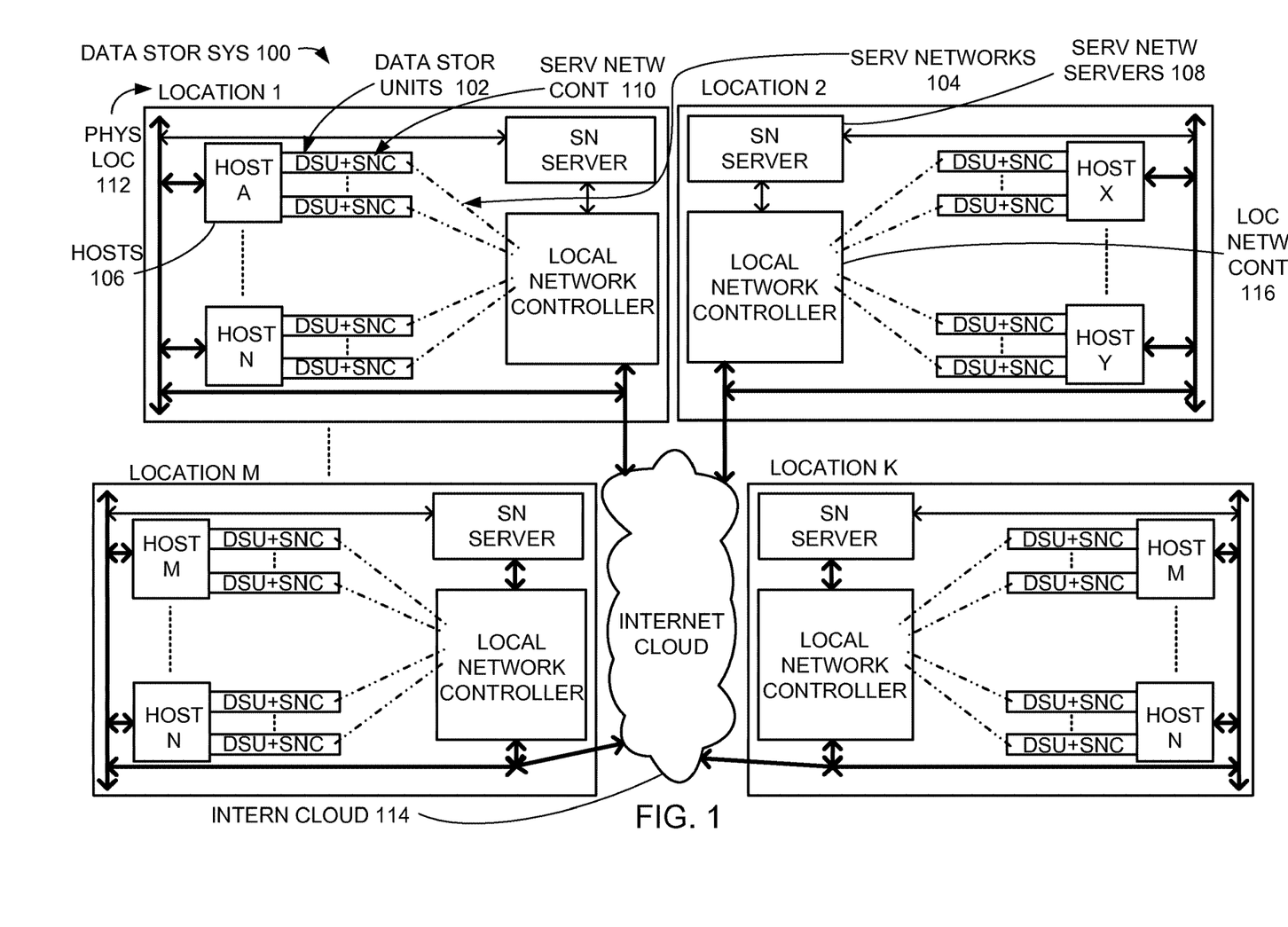
FIG. 1 is a data storage system with information exchange mechanism in a first embodiment of the present invention.

Referring now to FIG. 1, therein is shown a data storage system 100 with information exchange mechanism in a first embodiment of the present invention. The data storage system 100 can include the information exchange mechanism applied to an internet of data storage units 102 (DSU). The data storage units 102 are devices for recording or storing information.

The data storage system 100 can include the data storage units 102 connected in service networks 104 in a system with multiple hosts 106. The hosts 106 send or receive information from the data storage units 102. The service networks 104 manage and provide the information exchange mechanism among devices that are connected with each other.

The data storage units 102 can hold information, process information, or a combination thereof. For example, the data storage units 102 can be connected together as an internet of drives. Also for example, the data storage units 102 can include data storage devices, such as a hard disk drives, memory card readers or drives, disk enclosures, volatile memories, and non-volatile memories. Further, for example, the data storage units 102 can include embedded Multi-Media Controllers (eMMC) and solid state drives (SSD).

The data storage system 100 can include service network servers 108. For example, the service network servers 108 can preferably include wireless service network (WSN) servers or can include servers for any other communication networks including wired networks.

Each of the service network servers 108 can communicate with one of service network controllers 110 locally within each of the service networks 104. The service network servers 108 can also communicate with each other. The service network servers 108 can be at different physical locations 112.

For example, the service network controllers 110 can preferably include wireless service network controllers (WSNC) or can include controllers for any other communication networks including wired networks. Also for example, the service network controllers 110 can be implemented or integrated in the data storage units 102.

As an example, one of the service network servers 108, such as a local service network server, can be locally located at one of the physical locations 112, such as a local location. The local service network server can communicate with another of the service network servers 108, such as a remote service network server. The remote service network server can be at another of the physical locations 112, such as a remote location, that is physically different and away from the local location.

As another example, the local service network server can also communicate with the service network controllers 110 in the remote location, such as remote service network controllers. As a further example, the service network controllers 110 in the local location, such as local service network controllers, and the remote service network controllers can communicate with each other to exchange information.

The service network servers 108 can communicate with the hosts 106 through regular networks used for transferring user or control data. The regular networks referred to herein can include physical structures for providing connectivity among communication devices, wherein the physical structures are different from the service networks 104.

The hosts 106 can be connected to one or multiple of the data storage units 102 and one or multiple of the service network controllers 110. The hosts 106 can be in different physical locations 112. For example, one of the hosts 106 can be in one of the physical locations 112 and another of the hosts 106 can be in another of the physical locations 112.

The service networks 104 can be established and connected remotely with the hosts 106 at different physical locations 112. The service networks 104 can be established and connected remotely via an internet infrastructure or an internet cloud 114. The service networks 104 can be established and managed by local network controllers 116. Each of the service networks 104 can be managed by one of the local network controllers 116 that is locally located in each of the physical locations 112.

For example, the local network controllers 116 can preferably include wireless network access points and routers for providing control or management of the service networks 104. Also for example, one of the service networks 104 in the local location, such as a local service network, can be established and connected remotely with the hosts 106 at the remote location. Further, for example, the local service network can be established and connected to another of the service networks 104 in the remote location, such as a remote service network, via the internet cloud 114 and the local network controllers 116.

Embodiments of the present invention provide connections among various types of the data storage units 102 on the service networks 104 to exchange information between the data storage units 102. The embodiments also provide communication of the data storage units 102 with a centralized controller using the service network servers 108, the service network controllers 110, the local network controllers 116, or a combination thereof for health status monitoring, workload balancing, and/or metadata management of the data storage units 102.

The service networks 104 can include any communication mechanisms preferably including wired networks or including wired networks and open standard or proprietary interfaces. The information exchange mechanism provided within the service networks 104 can include non-user data. The non-user data includes information that is used to control or manage the data storage units 102.

Embodiments of the present invention create a side-band "service network" or the service networks 104 among the data storage units 102 for easier implementation and mitigation of hardware and host operating system (OS) driver compatibility issues. The service networks 104 can be built easily and cost-effectively.

For example, the service networks 104 can include the Internet of Things (IoT) that has established an ecosystem for low cost, low power, and small footprint implementations. Also for example, the service networks 104 can include WiFi, ZigBee, Bluetooth, or other wireless protocols. All of these wireless protocols, with or without bridges, can be connected to the internet for remote and centralized access.

The embodiments provide a cost effective solution with costs below a few dollars. The embodiments also provide power consumption reduction with powers below tens of milliwatts (mW). The embodiments can connect the data storage units 102 of an entire data center onto the service networks 104 easily.

Information exchanged between the data storage units 102 and the hosts 106 or the local network controllers 116 can be very easy and useful. Critical parameters can be collected real-time and easily. For example, the critical parameters that are important to the operation and life-spans of the data storage units 102 can include temperature, terabytes written (TBW), bit error rates (BER), elapse time, power on time, etc.

This collection of information to check statuses of the data storage units 102 can be done in parallel with and without interrupting the hosts 106 and the data storage units 102 from their normal operation. Health status of the data storage units 102 can be monitored real-time and easily to perform prevention actions, which are operations that eliminate premature or early failures of the data storage units 102 thereby maximizing the life-spans of the data storage units 102.

Maintenance of the data storage units 102 can be performed easily. For example, the maintenance can include firmware update, file system repair, data scribing, refresh, etc. Mechanisms to initiate point-to-point optimization commands are provided. Wear leveling between or among the data storage units 102 is made possible.

Storage controllers or networks can be informed to route hot data and cold data to appropriate drives or the data storage units 102. The storage controllers can be implemented using the service network servers 108, the service network controllers 110, and the local network controllers 116. The networks can be implemented using the service networks 104.

The embodiments can provide real-time information for debug and characterization data of the data storage units 102. The embodiments can tune Flash Translation Layer (FTL) performance and metadata real-time based on workloads and health conditions of each of the data storage units 102 including drives. The embodiments can provide backup of critical metadata from the data storage units 102.

For example, the data storage system 100 can be applicable for Serial ATA (SATA) SSD in data centers. As a specific example, the data storage system 100 can be applied to an existing SATA SSD by adding a ZigBee or WiFi wireless module to each of the SATA SSDs. As another specific example, a ZigBee or WiFi network can be established within each of the service networks 104 for all of the data storage units 102 and using a controller, bridge, or the local network controllers 116 to connect the data storage units 102 to the internet cloud 114.

As a further example, all of the SATA SSDs can be on the service networks 104. The data storage system 100 provides all the benefits previously mentioned and more. As a yet further example, the service networks 104 can be operated at a low rate that is lower than a rate used by actual normal storage applications.

For example, the data storage system 100 can be applicable to eMMC evaluation boards. Also for example, one of the applications of the data storage system 100 can be on a an eMMC-type of a soldered-down SSD in a single ball grid array (BGA) package that can be used in cell phone and automotive applications. In the automotive applications, the data storage system 100 can provide wireless monitoring of the data storage units 102 for service technicians without ripping out dashboards or other covers.

As a specific example, the data storage system 100 can be applied on an existing eMMC evaluation board by adding a ZigBee or WiFi wireless module. As another specific example, a ZigBee or WiFi network can be established with a personal computer (PC). While storage devices or the data storage units 102 are under evaluation, health indicators of the data storage units 102 can be read easily and real-time.

Figure 2:
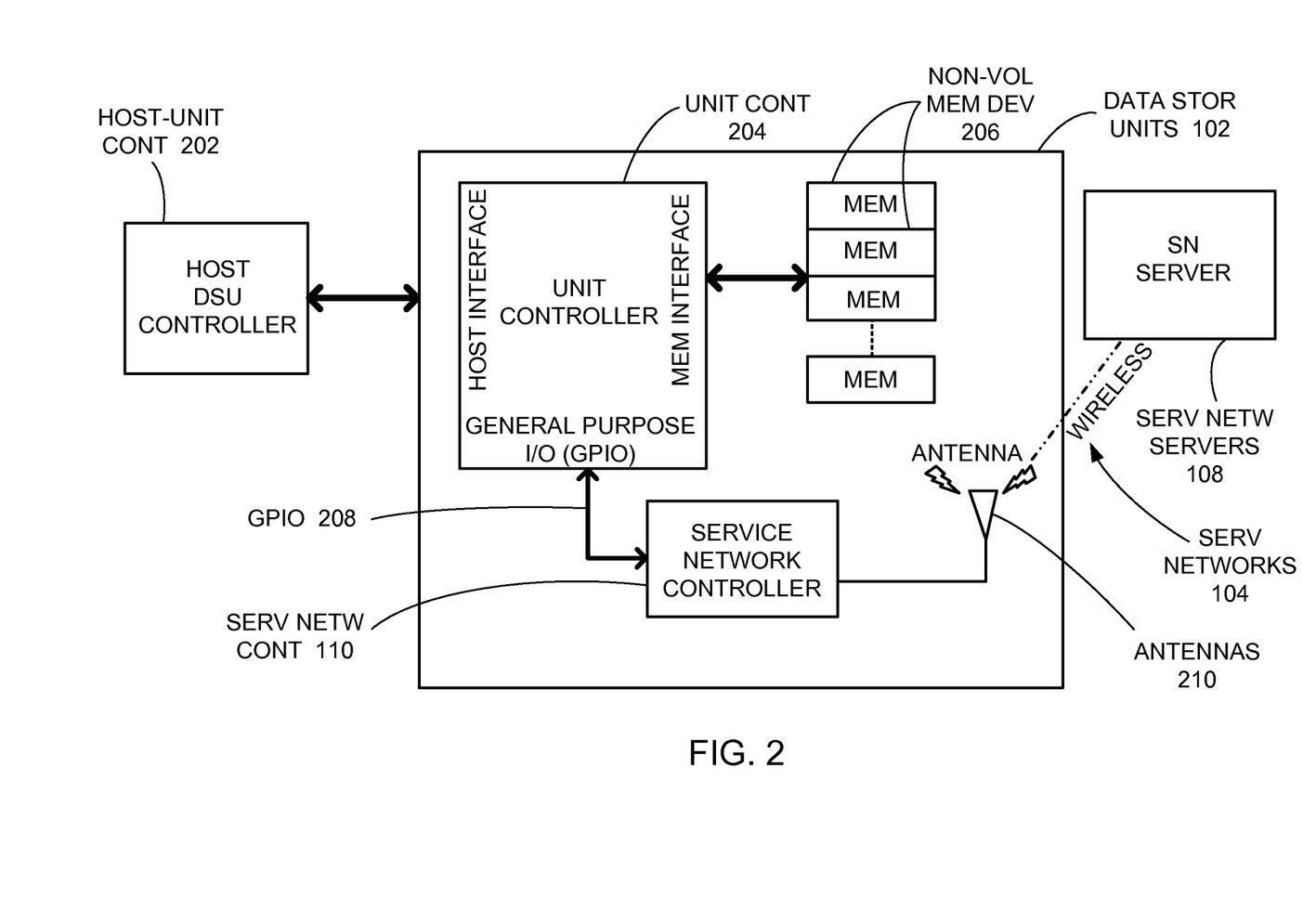
FIG. 2 is an exemplary implementation of the data storage units.

Referring now to FIG. 2, therein is shown an exemplary implementation of the data storage units 102. The exemplary implementation is depicted with one of the data storage units 102.

The data storage units 102 can be connected and communicate with host-unit controllers 202, which provide interface and exchange of information between the data storage units 102 and the hosts 106 of FIG. 1. For example, the data storage units 102 can include SSD-based data storage units. Also for example, the host-unit controllers 202 can include host-DSU controllers.

The data storage units 102 can include unit controllers 204 interfaced with the service network controllers 110 and a number of non-volatile memory devices 206. Each of the unit controllers 204 includes a host interface to communicate with one of the host-unit controllers 202.

The unit controllers 204 include a number of general purpose inputs/outputs 208 (GPIO) for interfacing with one of the service network controllers 110. The general purpose inputs/outputs 208 provide physical connections for transferring information between the hosts 106 and the service network servers 108 through the unit controllers 204. The general purpose inputs/outputs 208 can be programmed to provide a serial interface for serially transmitting information.

The service network controllers 110 can preferably be connected to antennas 210 to wirelessly communicate with the service network servers 108 through the service networks 104. For illustrative purposes, the antennas 210 are shown outside of the service network controllers 110, although it is understood that the antennas 210 can be implemented differently. For example, the antennas 210 can be implemented or included in the service network controllers 110.

The unit controllers 204 include a memory interface to communicate with the non-volatile memory devices 206. For example, the non-volatile memory devices 206 can include NAND, any other flash memory devices, or non-volatile data storage devices.

Figure 3:
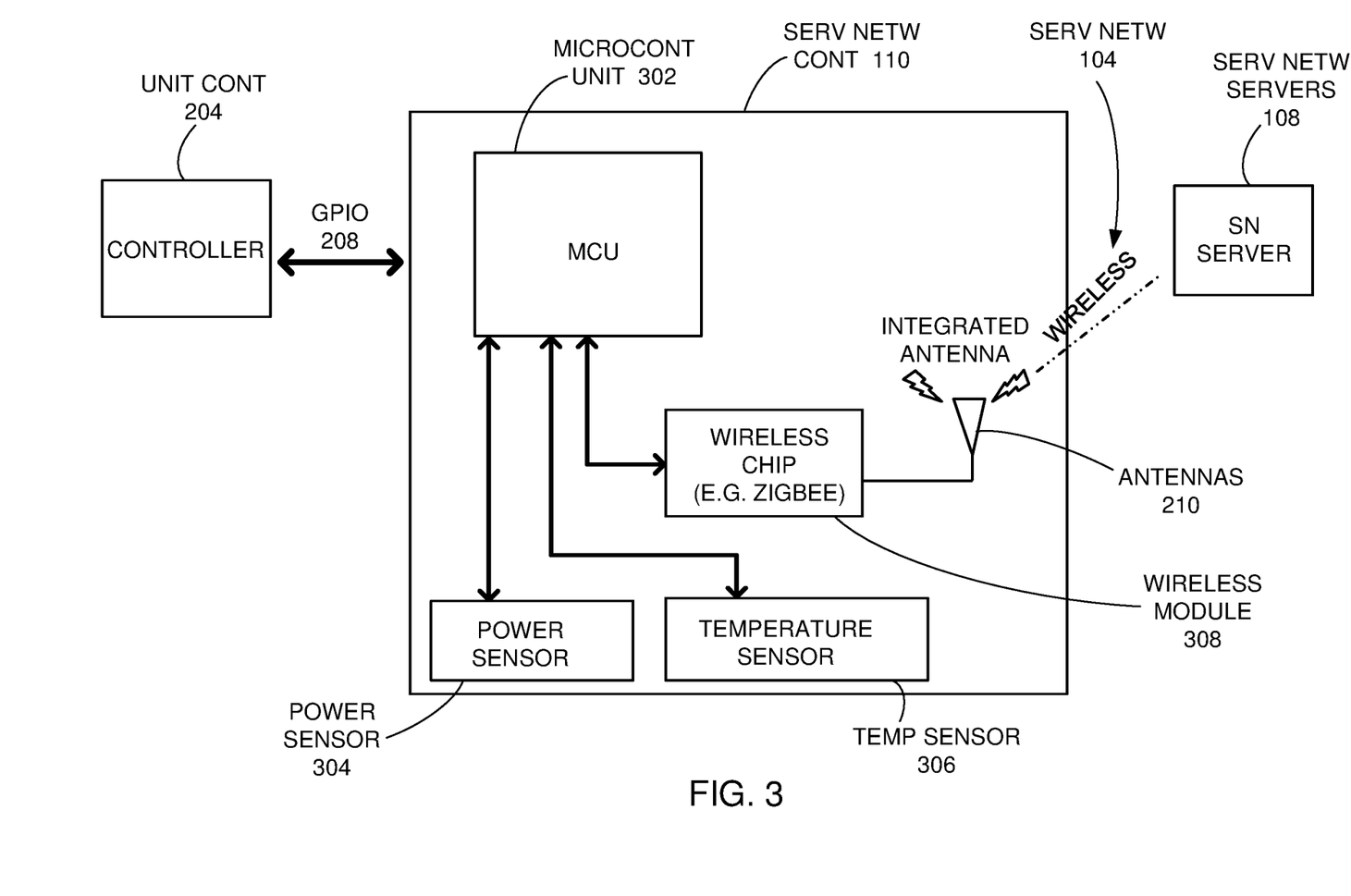
FIG. 3 is an exemplary implementation of the service network controllers.

Referring now to FIG. 3, therein is shown an exemplary implementation of the service network controllers 110. The exemplary implementation is depicted with one of the service network controllers 110.

Each of the service network controllers 110 can be connected and communicate with the unit controllers 204 through the general purpose inputs/outputs 208. Each of the service network controllers 110 can include a microcontroller unit 302, denoted as MCU, interfacing with a power sensor 304 and a temperature sensor 306.

Each of the service network controllers 110 can preferably include a wireless module 308. The wireless module 308 can be connected to the antennas 210. The antennas 210 can be included or integrated in each of the service network controllers 110. For example, the wireless module 308 can include a wireless chip.

The microcontroller unit 302 controls operations of the power sensor 304 and the temperature sensor 306 to collect operating power and temperature information about the data storage units 102 of FIG. 1. The microcontroller unit 302 controls an operation of the wireless module 308 to provide wireless connectivity between the data storage units 102 and the service network servers 108 through the antennas 210, the service networks 104, and the local network controllers 116 of FIG. 1.

Figure 4:
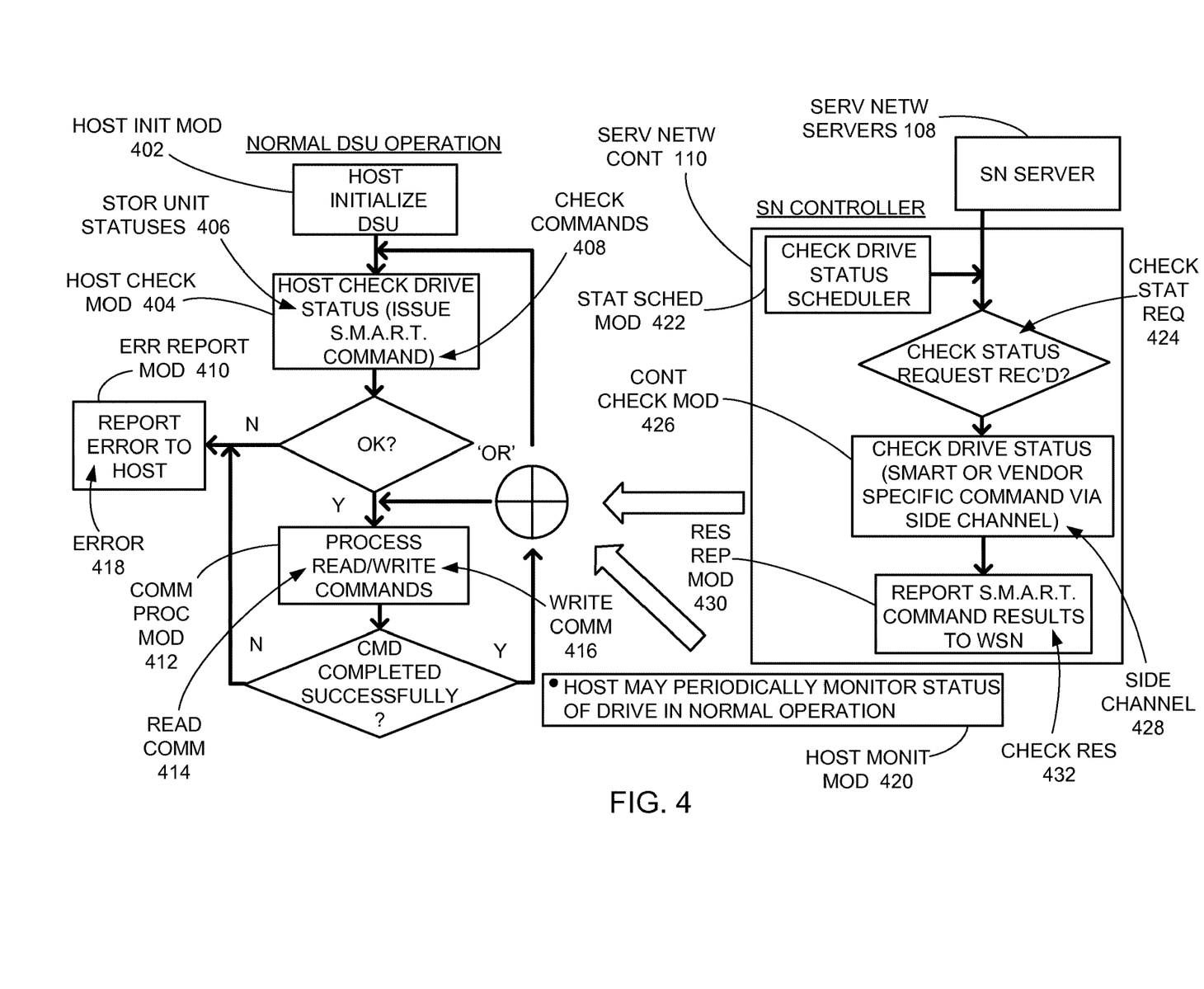
FIG. 4 is an operational flow chart of the data storage system of FIG. 1.

Referring now to FIG. 4, therein is shown an operational flow chart of the data storage system 100 of FIG. 1. The operational flow chart depicts a normal operation of the data storage units 102 of FIG. 1 on the left side of FIG. 4 and an operation of the service network controllers 110 on the right side of FIG. 4.

In the normal operation of the data storage units 102, the data storage system 100 can include a host initialization module 402. The host initialization module 402 initializes the data storage units 102 at the beginning of the normal operation before the data storage units 102 operate.

The data storage system 100 can include a host check module 404. After the host initialization module 402 completes, the host check module 404 checks storage unit statuses 406 of the data storage units 102. The storage unit statuses 406 can be checked by the hosts 106 of FIG. 1 issuing check commands 408. The storage unit statuses 406 can refer to the critical parameters previously described. For example, the storage unit statuses 406 can indicate that one of the data storage units 102 is near its end of life or is weakening.

The check commands 408 are operations sent to the data storage units 102 to inquire about operational states of the data storage units 102. For example, the check commands 408 can include an S.M.A.R.T. command or any other commands that inquires about states of the data storage units 102.

The data storage system 100 can include an error report module 410 and a command process module 412. If the host check module 404 determines that the storage unit statuses 406 is OK indicating that there is no failure with the data storage units 102, the command process module 412 processes one of read commands 414 or one of write commands 416.

The read commands 414 are operations performed on the data storage units 102 to retrieve data or information from the data storage units 102. The write commands 416 are operations performed on the data storage units 102 to store data or information to the data storage units 102.

If the read commands 414 and the write commands 416 are completed successfully, the command process module 412 processes another of the read commands 414 or another of the write commands 416. The successful completion of the read commands 414 or the write commands 416 indicates that retrieval or storing operations performed on the data storage units 102 complete without any failures.

If the host check module 404 determines that the storage unit statuses 406 is not OK indicating that there is a failure with the data storage units 102, the error report module 410 reports an error 418 to the hosts 106. If the read commands 414 or the write commands 416 are not completed successfully, the error report module 410 reports the error 418 to the hosts 106.

The error 418 indicates that there is either a failure with the data storage units 102. The error 418 also indicates that the read commands 414 or the write commands 416 are not completed successfully.

The data storage system 100 can include a host monitor module 420. The host monitor module 420 allows the hosts 106 to periodically monitor the storage unit statuses 406 of any of the data storage units 102 in the normal operation. The storage unit statuses 406 can be monitored periodically by the host monitor module 420 performing the monitoring at equal intervals.

The periodical monitoring of the storage unit statuses 406 by the host monitor module 420 impacts availability and performance of the hosts 106 and thus would create a problem that negatively affects the overall performance of the data storage system 100. After the storage unit statuses 406 is monitored by the host monitor module 420, the command process module 412 can proceed processing the read commands 414 or the write commands 416.

The service network controllers 110 can solve this problem by monitoring the storage unit statuses 406 more frequently and thus reducing host requests, thereby improving the overall performance of the data storage system 100. The service network controllers 110 can be connected to the service network servers 108.

Each of the service network controllers 110 can include a status scheduler module 422. The status scheduler module 422 generates and submits check status requests 424 to a controller check module 426. The service network servers 108 can also optionally submit the check status requests 424 to the controller check module 426. The check status requests 424 are information used to inquire the storage unit statuses 406 of the data storage units 102.

When the controller check module 426 receives the check status requests 424, the controller check module 426 checks the storage unit statuses 406 of the data storage units 102. The storage unit statuses 406 can be checked by the controller check module 426 issuing the check commands 408.

The controller check module 426 can also issue the check commands 408 using a vendor specific command. The check commands 408 sent by the controller check module 426 can be performed via a side channel 428 that interfaces the controller check module 426 and the data storage units 102.

The side channel 428 is separate from data and command buses connected between a controller and storage devices. The side channel 428 does not affect the normal data transmission into and out of the data storage units 102 since the side channel 428 is a separate communication mechanisms than the data and command buses. The side channel 428 can refer to the side-band "service network" previously described.

The data storage system 100 can include a result report module 430. After the storage unit statuses 406 is checked, the result report module 430 reports a check result 432 to the service network servers 108. The check result 432 is a result of an evaluation of the storage unit statuses 406. After the check result 432 is reported to the service network servers 108 and is determined as good such that the data storage units 102 can be reliably accessed, the command process module 412 can proceed processing the read commands 414 or the write commands 416.

The status scheduler module 422, the controller check module 426, and the result report module 430 in the service network controllers 110 can operate in parallel with the normal operation of other components of the data storage system 100 including the hosts 106 and the data storage units 102. The status scheduler module 422, the controller check module 426, and the result report module 430 can operate to collect information to check the storage unit statuses 406 in parallel with and without interrupting the hosts 106 and the data storage units 102 from their normal operation.

All of the data storage units 102 can be concurrently accessed to check for the storage unit statuses 406. The storage unit statuses 406 of each of the data storage units 102 can then be used to determine the next appropriate service action as necessary. For example, the status scheduler module 422 submitting the check status requests 424 and the controller check module 426 checking the storage unit statuses 406 can occur concurrently or in parallel with the command process module 412 processing the read commands 414 or the write commands 416.

It has been found that the status scheduler module 422 for generating the check status requests 424 without interrupting the hosts 106 provides improved performance because the check status requests 424 for inquiring the storage unit statuses 406 do not affect availability and performance of the hosts 106.

It has also been found that the status scheduler module 422 for generating the check status requests 424 without interrupting the data storage units 102 and concurrently with the processing of the read commands 414 and the write commands 416 provides improved performance. The performance is improved because the check status requests 424 for inquiring the storage unit statuses 406 do not affect performance and operation of the data storage units 102 during user data transfer operations.

It has further been found that the controller check module 426 for checking the storage unit statuses 406 based on the check status requests 424 and for generating the check commands 408 without interrupting the hosts 106 and the data storage units 102 provides improved performance. The performance is improved because the controller check module 426 operates in parallel with the hosts 106 and the data storage units 102 and thus does not affect performance during user data transfer operations of the hosts 106 and the data storage units 102.

It has further been found that the result report module 430 for reporting the check result 432 based on the check commands 408 provides improved reliability because the check result 432 is used to determine that the data storage units 102 are reliably accessed before the read commands 414 and the write commands 416 are processed.

Functions or operations of the data storage system 100 as described above can be implemented using modules. The functions or the operations of the data storage system 100 can be implemented in hardware, software, or a combination thereof.

For example, the host initialization module 402, the host check module 404, the error report module 410, the command process module 412, and the host monitor module 420 can be implemented using the hosts 106, the data storage units 102, the host-unit controllers 202 of FIG. 2, or a combination thereof. Also for example, the status scheduler module 422 can be implemented using the service network servers 108, the unit controllers 204 of FIG. 2, the non-volatile memory devices 206 of FIG. 2, the general purpose inputs/outputs 208 of FIG. 2, the antennas 210 of FIG. 1, the microcontroller unit 302 of FIG. 3, the power sensor 304 of FIG. 3, the temperature sensor 306 of FIG. 3, the wireless module 308 of FIG. 3, or a combination thereof.

Further, for example, the controller check module 426 can be implemented using the service network servers 108, the unit controllers 204, the non-volatile memory devices 206, the general purpose inputs/outputs 208, the antennas 210, the microcontroller unit 302, the power sensor 304, the temperature sensor 306, the wireless module 308, or a combination thereof. Yet further, for example, the result report module 430 can be implemented using the service network servers 108, the unit controllers 204, the non-volatile memory devices 206, the general purpose inputs/outputs 208, the antennas 210, the microcontroller unit 302, the power sensor 304, the temperature sensor 306, the wireless module 308, or a combination thereof.

The data storage system 100 is described with module functions or order as an example. The modules can be partitioned differently. Each of the modules can operate individually and independently of the other modules. Furthermore, data generated in one module can be used by another module without being directly coupled to each other.

The host initialization module 402 can be coupled to the host check module 404. The host check module 404 can be coupled to the error report module 410 and the command process module 412. The command process module 412 can be coupled to the host check module 404 and the error report module 410. The host monitor module 420 can be coupled to the host check module 404 and the command process module 412.

The status scheduler module 422 can be coupled to the controller check module 426. The controller check module 426 can be coupled to the result report module 430. The result report module 430 can be coupled to the host check module 404 and the command process module 412.

The physical transformation of generating the check status requests 424 to inquire the storage unit statuses 406 results in movement in the physical world, such as people using the data storage units 102 based on the operation of the data storage system 100. As the movement in the physical world occurs, the movement itself creates additional information that is converted back to processing the read commands 414 and the write commands 416 to be performed on the data storage units 102 for the continued operation of the data storage system 100 and to continue the movement in the physical world.

Figure 5:
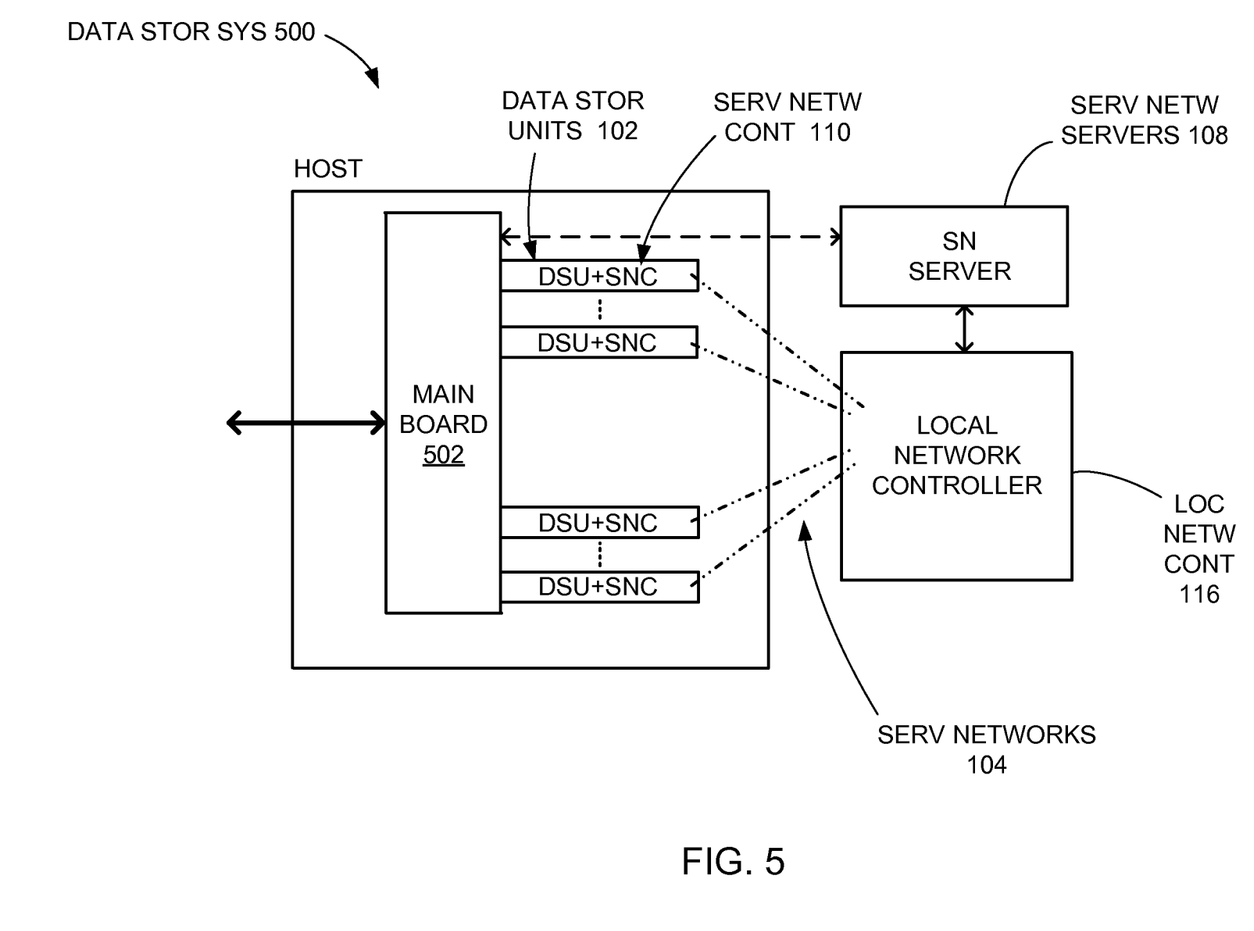
FIG. 5 is a data storage system with information exchange mechanism in a second embodiment of the present invention.

Referring now to FIG. 5, therein is shown a data storage system 500 with information exchange mechanism in a second embodiment of the present invention. The data storage system 500 is shown as an example implementation of the service networks 104 within one storage system.

One of the service network servers 108 can establish communication with each of the service network controllers 110. The communication can be established through one of the local network controllers 116 and the service networks 104.

Each of the service network controllers 110 can collect metadata on the data storage units 102 attached thereto. The metadata can be sent to the service network servers 108. The metadata is information associated with the data storage units 102 for management or maintenance of the data storage units 102.

The service network servers 108 can analyze the metadata collected and provide instructions back to the service network controllers 110 and the data storage units 102. The service network servers 108 can also communicate with a central processing unit (CPU) in a mainboard 502 to redirect data to be stored to specific data storage units 102.

The mainboard 502 is a motherboard of a host system. The mainboard 502 can include a single printed circuit board (PCB) or any number of PCBs. The mainboard 502 can represent a system board, a planar board, or a logic board. The mainboard 502 can include electronic components, such as the CPU and memory. The mainboard 502 can provide connectors for peripherals.

One example of the data storage system 500 is to provide wear leveling among the data storage units 102 including SSDs. The wear leveling can be performed by monitoring the health status of storage elements including NAND flash blocks within individual DSUs or each of the data storage units 102. The wear leveling can be performed using the service network servers 108, the service network controllers 110, the data storage units 102, the local network controllers 116, the service networks 104, or a combination thereof.

Another example of the data storage system 500 is to direct the CPU of the mainboard 502 to avoid hot DSUs and use cold DSUs. Hot DSUs are DSUs with data that are accessed frequently. Cold DSUs are DSUs with data that are accessed infrequently. Hot DSUs include data that are accessed more frequently than those in cold DSUs.

Figure 6:
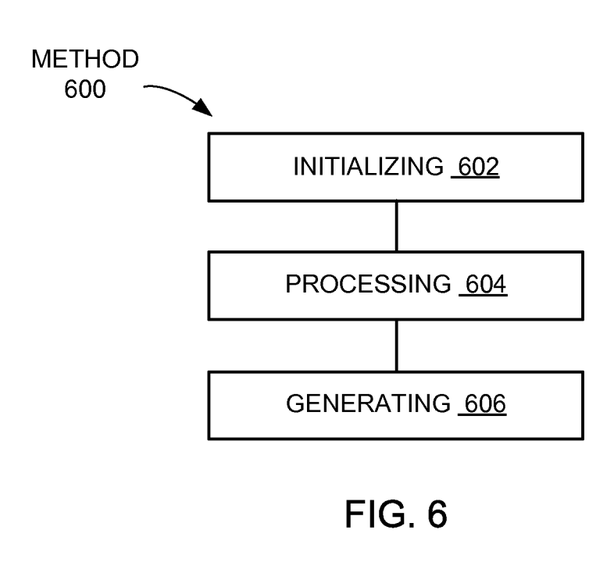
FIG. 6 is a flow chart of a method of operation of a data storage system in a further embodiment of the present invention.

Referring now to FIG. 6, therein is shown a flow chart of a method 600 of operation of a data storage system in a further embodiment of the present invention. The method 600 includes: initializing a data storage unit in a block 602; processing a read command or a write command performed on the data storage unit in a block 604; and generating a check status request to inquire a storage unit status of the data storage unit, wherein the check status request occurs without interrupting a host in a block 606.

Thus, it has been discovered that the data storage system 100 of embodiments of the present invention furnish important and heretofore unknown and unavailable solutions, capabilities, and functional aspects for a data storage system with information exchange mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of embodiments of the present invention is that it valuably supports and services the historical trend of reducing costs, simplifying systems, and increasing performance.

These and other valuable aspects of embodiments of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a data storage system comprising:
   transferring user data over a wired data channel between a host interface of a unit controller of a data storage unit and a host controller of a host;
   receiving a check status request periodically from a service network server at a service network controller of the data storage system to check a storage unit status of the data storage unit in real-time and in parallel with transferring the user data over the wired data channel to the host;
   generating a check result of the data storage unit based on evaluating the storage unit status using a service network controller within the data storage unit;
   transferring, wireles sly via an antenna of the data storage unit, the check result to service network server over a service network channel without interrupting the wired data channel; and
   initiating wear-leveling between the data storage unit and another data storage unit upon receiving an error message based on the check result from the service network server.

2. The method as claimed in claim 1 wherein generating the check result includes generating the check result concurrently with the transferring of the user data over the wired data channel.

3. The method as claimed in claim 1 wherein the service network channel has a different physical structure than the wired data channel.

4. The method as claimed in claim 1 wherein the storage unit status is one of: a temperature, a terabytes written, a bit error rate, an elapsed time, or a power on time.

5. The method as claimed in claim 1 wherein the service network channel is over a ZigBee or WiFi network.

6. The method as claimed in claim 1, further comprising performing a command at the unit controller based on the check result.

7. The method as claimed in claim 1 wherein the wired data channel is a SATA bus.

8. The method as claimed in claim 1 wherein generating the check result includes generating the storage unit status based on a power sensor.

9. The method as claimed in claim 1 wherein transferring the user data includes transferring the user data between the host and the non-volatile memory device over a memory interface of the unit controller.

10. The method as claimed in claim 1 wherein transferring the check result includes reporting the check result over the antenna integral within the service network controller.

11. A data storage system comprising:
   a service network server; and
   a data storage unit, coupled to the service network server, comprising:
      a host interface of a unit controller configured to transfer user data over a wired data channel between the host interface and a host controller of a host,
      a status scheduler module within a service network controller of the data storage system configured to receive a check status request from the service network server to check a storage unit status of the data storage unit in real-time and in parallel with transferring the user data over the wired data channel to the host, a memory interface of the unit controller configured to transfer the user data between a non-volatile memory device and the unit controller, and the service network controller, coupled to the unit controller, configured to collect a storage unit status of the data store unit in real-time and in parallel with transferring the user data over the wired data channel to the host, and to generate a check result of the data storage unit based on evaluating the storage unit status, wirelessly transfer the check result to a service network over a service network channel via an antenna of the data storage unit without interrupting the wired data channel, and initiate wear-leveling between the data storage unit and another data storage unit upon receiving an error message based on the check result from the service network server.

12. The system as claimed in claim 11 wherein the service network controller is further configured to generate the check result concurrently with the transfer of the user data over the wired data channel.

13. The system as claimed in claim 11 wherein the service network controller is further configured to report the check result over the service network channel having a different physical structure than the wired data channel.

14. The system as claimed in claim 11 wherein the service network controller is further configured to generate the storage unit status having a temperature, terabytes written, bit error rate, elapsed time, or power on time.

15. The system as claimed in claim 11 wherein the service network controller is further configured to report the check result wirelessly over a ZigBee or WiFi network.

16. The system as claimed in claim 11 wherein the unit controller is further configured to perform a command based on the check result.

17. The system as claimed in claim 11 wherein the unit controller is further configured to transfer the user data over a SATA bus.

18. The system as claimed in claim 11 wherein the service network controller is further configured to generate the storage unit status based on a power sensor.

19. The system as claimed in claim 11 wherein the unit controller is further configured to transfer the user data between the host and the non-volatile memory device over a memory interface.

20. The system as claimed in claim 11 wherein the service network controller is configured to report the check result over an antenna integral with the service network controller.

* * * * *

UNITED STATES PATENT AND TRADEMARK OFFICE
CERTIFICATE OF CORRECTION

PATENT NO. : 10,826,989 B2
APPLICATION NO. : 14/512624
DATED : November 3, 2020
INVENTOR(S) : Lin et al.

Page 1 of 1

It is certified that error appears in the above-identified patent and that said Letters Patent is hereby corrected as shown below:

In the Claims

Column 12
Claim 1: Line 22: Delete "wireles sly" and insert --wirelessly--

Signed and Sealed this
Fifteenth Day of December, 2020

Andrei Iancu
*Director of the United States Patent and Trademark Office*